United States Patent [19]
Buyze

[11] 3,729,067
[45] Apr. 24, 1973

[54] MOUNTING MEANS AND DISK FOR AN EXTERNALLY SUPPORTED DISK BRAKE

[75] Inventor: Edwin K. Buyze, Philadelphia, Pa.

[73] Assignee: The Budd Company, Philadelphia, Pa.

[22] Filed: Dec. 16, 1970

[21] Appl. No.: 98,508

[52] U.S. Cl.............188/18 A, 188/73.2, 188/218 XL, 192/70.2, 287/20.3, 287/53 SS
[51] Int. Cl................................................B60t 1/06
[58] Field of Search............188/18 A, 70.1, 218 XL, 188/73.2; 192/70.2; 287/20.3, 53 SS

[56] References Cited

UNITED STATES PATENTS

| | | | |
|---|---|---|---|
| 1,415,841 | 5/1922 | Seitz | 192/70.2 |
| 1,770,952 | 7/1930 | Stanard | 192/70.2 |
| 3,438,464 | 4/1969 | Barrington | 192/70.2 X |
| 3,435,924 | 4/1969 | Beuchle | 188/218 XL |
| 3,642,101 | 2/1972 | Hauth | 188/73.3 |

FOREIGN PATENTS OR APPLICATIONS

| | | | |
|---|---|---|---|
| 438,968 | 12/1967 | Switzerland | 188/18 A |
| 955,017 | 6/1949 | France | 287/53 SS |

Primary Examiner—George E. A. Halvosa
Attorney—Thomas I. Davenport, Edward M. Farrell, John D. Sowell, Alford L. Trueax, Jr. and William R. Nolte

[57] ABSTRACT

A driver and disk supported thereon for a vehicle disk brake assembly wherein the disk is floatingly supported by the driver. The disk includes an adjustable gib associated with a drive lug. Heat expansion during braking operation does not appreciably affect the clearance between the driver and the disk.

1 Claim, 7 Drawing Figures

Patented April 24, 1973   3,729,067
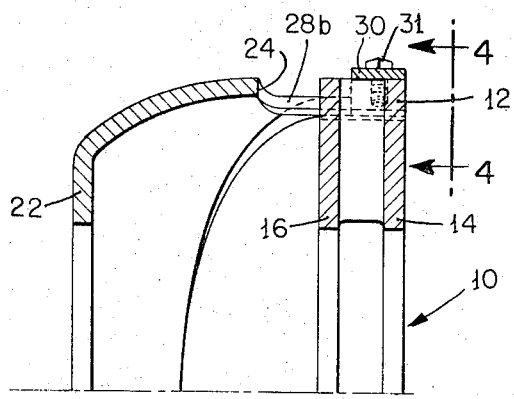
Fig.3
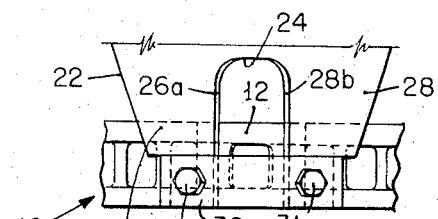
Fig.5
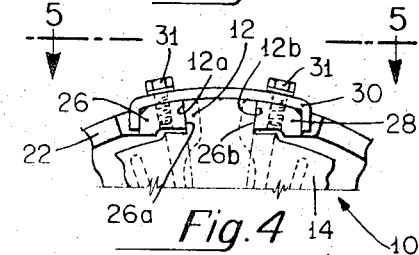
Fig.4
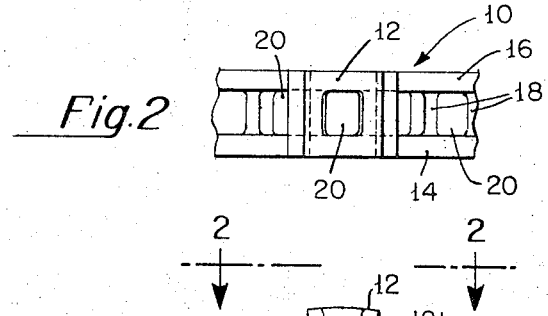
Fig.2
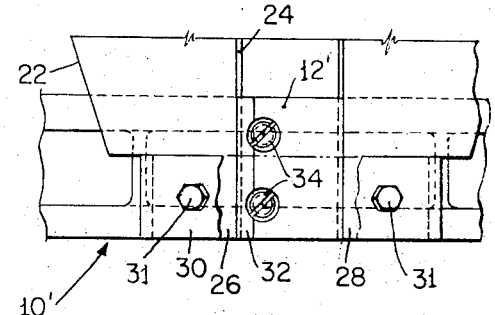
Fig.7
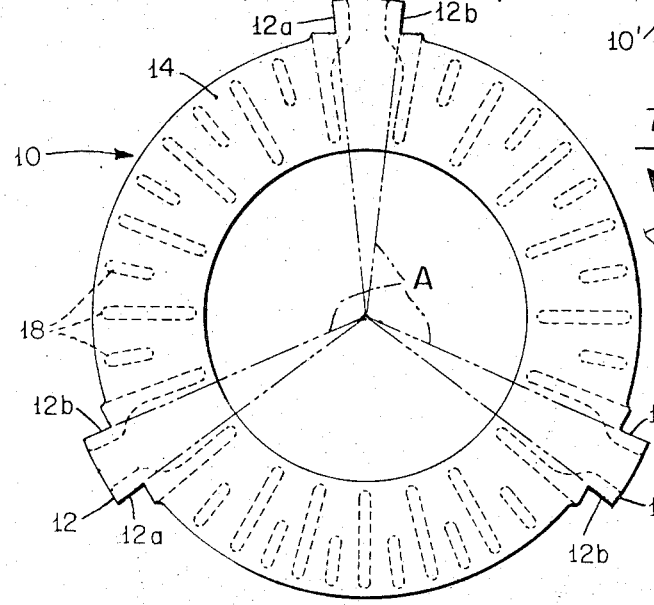
Fig.6
Fig.1
INVENTOR.
EDWIN K. BUYZE
BY
*A. L. Trueax, Jr.*
ATTORNEY 3,729,067

MOUNTING MEANS AND DISK FOR AN EXTERNALLY SUPPORTED DISK BRAKE

This invention relates to disk brakes for vehicles and more particularly to an externally supported floating disk and the supporting driver therefore.

In utilizing disk brakes on vehicles, the space available for positioning the disk, brake shoes and pressure actuating equipment is generally found to be limited. For automobiles and light vehicles an internally mounted brake disk with an externally positioned brake shoe support and actuator have been successful. When heavier vehicles utilize disk brakes, it has been found to be advantageous to use an externally supported disk with the brake shoe support and actuator mounted internally of the disk and generally supported on the vehicle axle, thus providing a longer effective lever arm when the brakes are applied.

When an externally supported disk is rigidly supported or attached to the driver, a floating caliper must be used to support the brake shoes. One problem that develops in this type external disk is that created by the expansion due to heating of the disk during braking operation. The disk expands more rapidly than its supporting driver often causing misalignment of the disk with the brake shoes and erratic braking.

When the disk has been floatingly mounted in a supporting driver and the caliper fixed, if a close tolerance is maintained at the connection between the driver and the disk, as the disk expands by the heat generated during braking, the connection between the driver and disk closes and the disk sticks to the support and ceases to float. If sufficient clearance is provided at the connection to avoid such sticking, an undesirable slapping and increased wear of the contacting surfaces creates an unsatisfactory structure.

It is an object of this invention to provide a floating externally supported disk and supporting driver for disk brake assembly that maintains a close tolerance at the connections between the disk and the driver at all times during all phases of braking operation.

Another object of this invention is to provide an externally supported brake disk with an adjustable mounting surface for properly adjusting the clearance between the disk and supporting driver.

These and other objects of this invention will become apparent as reference is made to the following specification and drawings.

FIG. 1 is a plan of the ventilated externally supported brake disk of this invention;

FIG. 2 is a view in the direction of the arrows, substantially along line 2—2 of FIG. 1, illustrating the side view of one of the drive lugs of this disk;

FIG. 3 is a side view with portions cut away of the novel brake disk mounted in the supporting driver;

FIG. 4 is a view in the direction of the arrows, substantially along the line 4—4 of FIG. 3, showing the drive lug positioned in the cooperating slot of the driver;

FIG. 5 is a view in the direction of the arrows, substantially along line 5—5 of FIG. 4, illustrating the position of the drive lug in the driver;

FIG. 6 is a view similar to FIG. 4 illustrating a second lug design for the novel disk that utilizes an adjustable gib to assure proper clearance between the lug and the driver;

FIG. 7 is a view in the direction of the arrows, substantially along the line 7—7 of FIG. 6.

Referring now to the drawings, as best seen in FIGS. 1 and 2, a floating brake disk 10 having a plurality of drive lugs 12 spaced about the periphery includes twin ring segments of approximately similar parallel rings 14, 16 joined by a number of generally radially extending ribs or braces 18. The openings 20 between the ribs 18 provide ventilation for assisting in cooling the disk between brake applications.

Referring now to FIGS. 3, 4 and 5 the disk 10 is floatingly supported by a driver 22 having a slot formed by fingers 26, 28 of the driver for receiving each of the drive lugs 12 therein. A brace plate 30 extends over the external surface of the driver 22 and is secured thereto by bolts 31 to strengthen the fingers 26, 28. The driver 22 is secured to a vehicle wheel (not shown) for rotation therewith in a conventional manner. A fixed caliper (not shown) is mounted on the axle for moving brake pads into contact with the disk to effect a braking action. With the caliper fixed, the disk 10 must be free to shift axially in the slots 24 for effective braking.

The sides 12a and 12b of the drive lugs 12 are formed as radial surfaces radiating from the center of the brake disk 10 as shown by phantom lines A in FIG. 1. The contacting surfaces 26a, 28b of fingers 26, 28 are also formed as radial surfaces for surface to surface contact with the drive lugs. Therefore, when heat is generated by frictional engagement of brake pads with the disk during brake application and the disk expands, the expansion is along radial lines and the clearance between the drive lugs 12 and the driver 22 will remain substantially constant. Thus, binding between the surfaces experienced by other floating disks is eliminated and excessive clearances previously required to prevent the binding and caused "slapping" upon application of the brake is also eliminated.

The surfaces 12a, 12b, 26a, 28b may be flame or induction heated and hardened for increased wear resistance or wear plates may be secured to these surfaces to reduce excessive wear during repeated brake application.

A modification of the drive lugs 12 is shown in FIGS. 6 and 7. The modified drive lug 12' has an adjustable gib 32 secured to the drive lug by a pair of bolts 34. The outer surface 32a of the gib 32 contacts the surface 26a of the driver 22. The clearances between the surfaces 26a, 32a and 12'b, 28b can be adjusted by tightening or loosening the bolts 34. Thus, proper clearances may be maintained between the driver 22 and the drive lugs 12'. The surface 32a is designed to provide a radial surface for contact with surface 26b as it is radially adjusted to provide proper clearance between the parts.

While but two embodiments of the present invention have been disclosed and described, it is obvious that other modifications may be made without departing from the scope of the following claims.

I claim:

1. In combination in a vehicle brake, a driver secured to a rotatable member, a disk supported by said driver for movement therewith, said disk having at least one drive lug, a slot in said driver for engaging and cooperating with said lug, said slot having a pair of cooperating sides formed as extensions of radial planes passing through the center line of said disk, said lug having one surface adjacent one of said cooperating sides of said slot formed on a radial plane passing through the center of said disk, an adjustable gib adjustably secured to said lug opposite said one surface, said gib having a surface formed as an extension of a radial plane passing through the center of said disk for contacting the adjacent cooperating side of said slot, and adjustment means for moving said gib radially on said lug whereby the width of the lug may be adjusted by such movement to provide proper clearance between the lug and the cooperating slot.

* * * * *